US006624355B1

(12) United States Patent
Gretz

(10) Patent No.: US 6,624,355 B1
(45) Date of Patent: Sep. 23, 2003

(54) LOW-VOLTAGE MOUNTING BRACKET

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/290,380

(22) Filed: Nov. 7, 2002

(51) Int. Cl.[7] .............................................. H01R 13/46
(52) U.S. Cl. ............................. 174/59; 174/66; 174/67; 220/241; 33/528
(58) Field of Search ............................. 174/58, 59, 64, 174/57, 60, 66, 67; 220/4.2, 3.8, 241, 242; 439/535; 248/906; 33/528, DIG. 10

(56) References Cited

U.S. PATENT DOCUMENTS

| 4,449,015 A | * | 5/1984 | Hotchkiss et al. ....... 174/138 F |
| 5,646,371 A | * | 7/1997 | Fabian ..................... 174/58 |
| 6,143,985 A | * | 11/2000 | Knapp et al. ............... 174/69 |
| 6,194,657 B1 | | 2/2001 | Gretz |
| 6,346,674 B1 | | 2/2002 | Gretz |
| 6,369,323 B1 | * | 4/2002 | Wright ....................... 174/51 |
| 6,452,098 B1 | | 9/2002 | Gretz |
| 6,452,813 B1 | | 9/2002 | Gretz |

* cited by examiner

Primary Examiner—Dhiru R Patel

(57) ABSTRACT

A terminal device for installing an access point for low voltage systems in newly constructed buildings. Low voltage systems typically employ coax cable, fiber optic cable, communications cables, or similar low voltage and wire. The device includes a rectangular mounting plate having an opening therein and a back side for facing a wall stud and a forward side for facing a subsequently installed wall. The plate includes a forward-extending lip surrounding the opening and perpendicular to the plate. The depth of the forward-extending lip is selected to be approximately equal to the thickness of the subsequently installed wall. Included on the back of the mounting plate is a wide rearward-extending flange including two integral bosses and a semi-circular ring. The rear side of the mounting plate and the outer surface of the wide flange join at a 90 degree angle to form a seat for flush fitting against a wall stud. The lip includes two integral bosses for accepting fasteners for securing a faceplate to the terminal device. The terminal device is installed by driving fasteners through the bosses of the wide flange and into a wall stud. The mounting plate is then securely fastened to a wall by tightened the faceplate fasteners. Low voltage wiring may then be routed through the semicircular ring for temporary storage or tied off to the ring to secure it thereto.

11 Claims, 4 Drawing Sheets

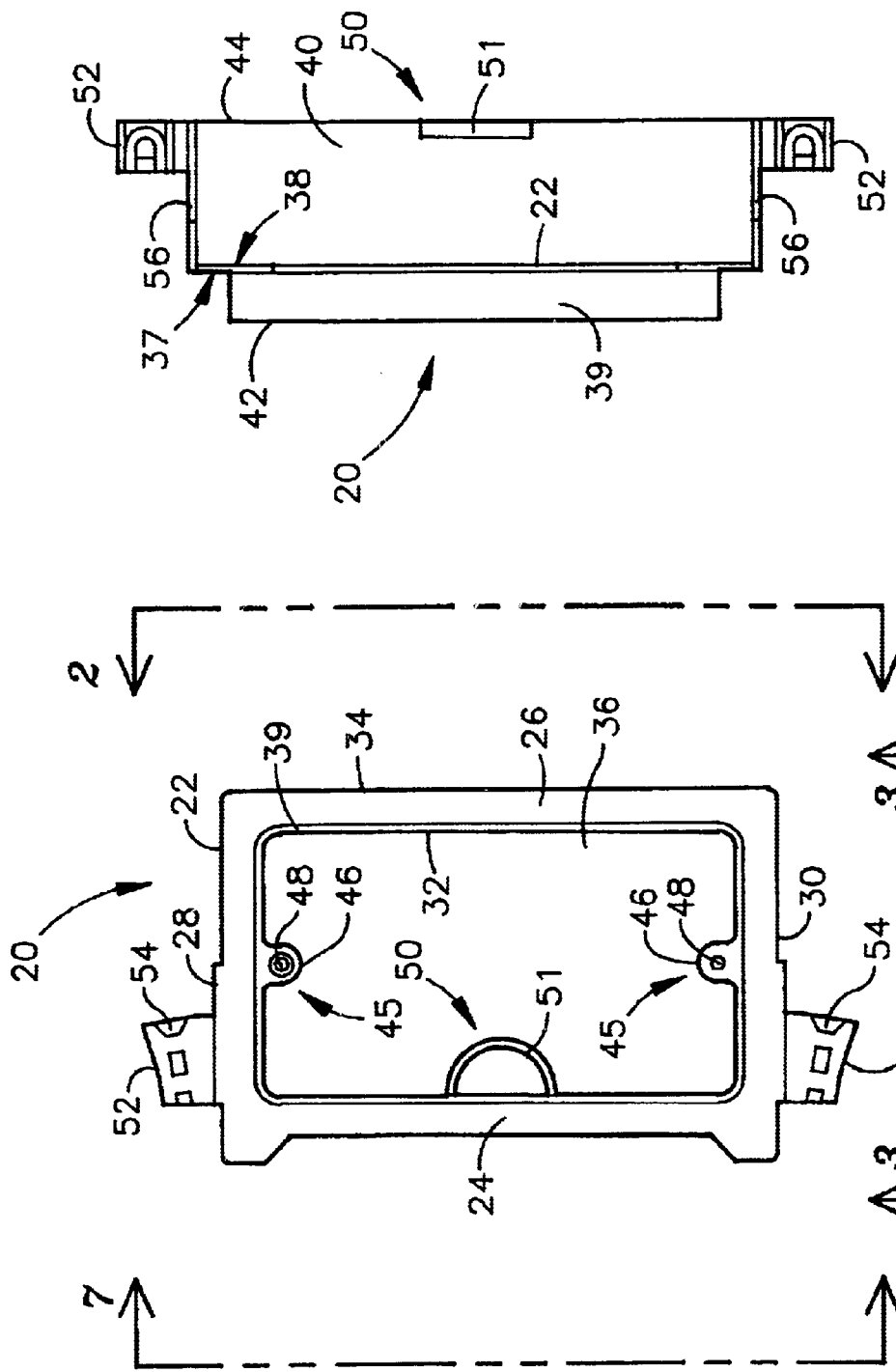

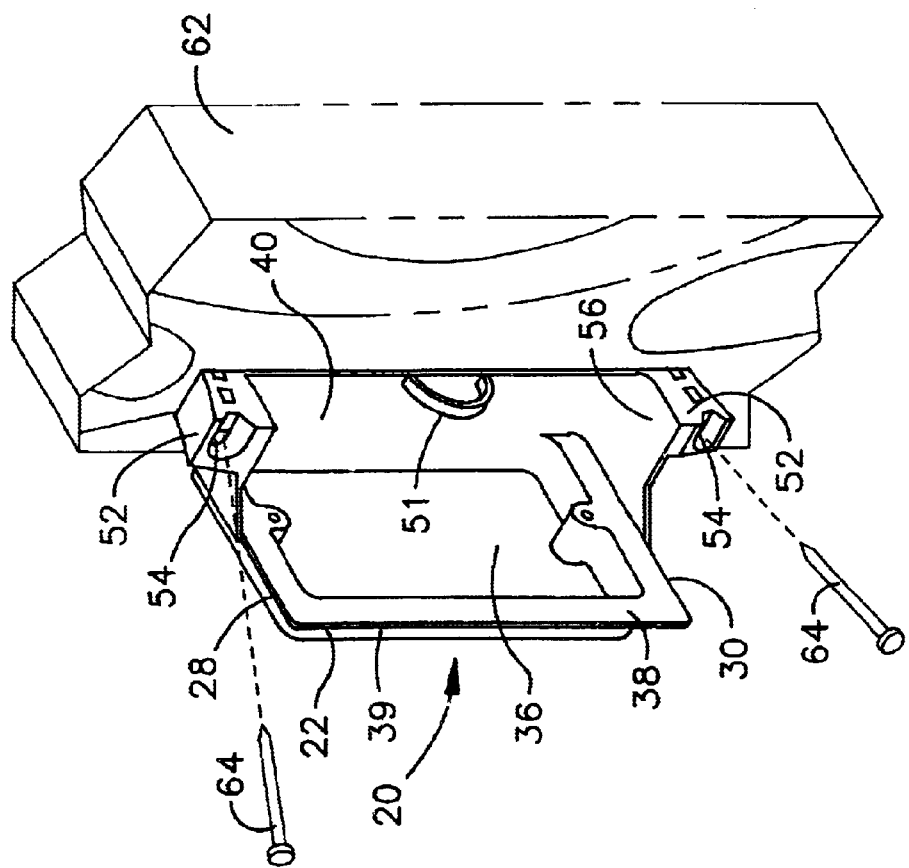
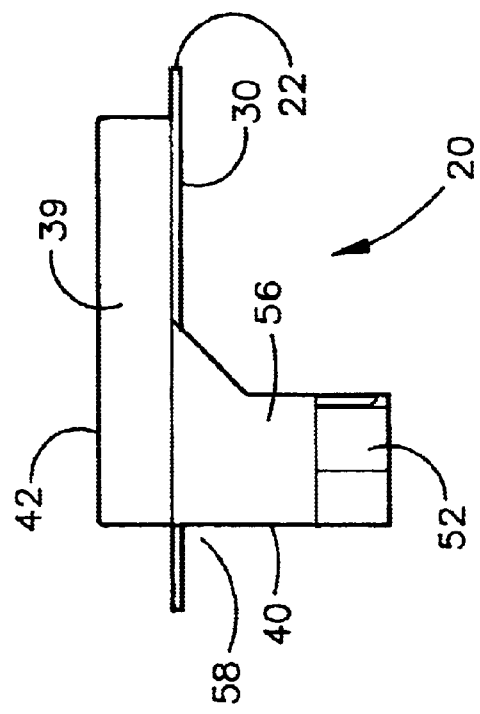
FIG. 4
FIG. 3

LOW-VOLTAGE MOUNTING BRACKET

FIELD OF THE INVENTION

This invention relates to terminal devices for low-voltage systems and specifically to a low cost terminal device that better resists separation from the wall stud by forward forces applied to a plug or other device connected thereto.

BACKGROUND OF THE INVENTION

Several approaches exist for connecting low-voltage devices such as coax cable, fiber optic cable, communications cables, or similar low voltage and wire in new construction. Typically, a metal or plastic box is secured to the framework of a building during the roughing-out phase of construction with the sheetrock or other finishing wall material later applied over the box. A faceplate, typically sized to overlap the box, is then fastened to the box and tightened until the faceplate is flush with the surrounding wall. While such an arrangement can provide a satisfactory mount for low-voltage devices, it is not uncommon for the faceplate to work loose from the box and move forward and backwards or sideways, thereby exposing open space between the faceplate and the surrounding wall.

The terminal device of U.S. Pat. No. 6,452,098, issued Sep. 17, 2002 (hereinafter the '098 patent), was therefore proposed by the present inventor for drawing the faceplate snugly against the wall and thereby eliminating the movement of the faceplate with respect to the wall.

Although the terminal device of the '098 patent eliminated movement of the faceplate with respect to the wall, forward and reverse movement of the terminal device and the attached faceplate were limited only by the sheet rock or similar wall material and by fasteners driven through the mounting ears. Since the mounting ears of the '098 patent were in the same plane as the mounting plate, they were not optimal in securing the mounting plate to the underlying framework to overcome repetitive stresses on the ears. The mounting ears were thus susceptible to bending or breaking from pull forces applied by repetitive connections and disconnections of devices to the mounting plate.

OBJECTS AND ADVANTAGES

The present invention provides a terminal device with the anchoring point placed well behind the mounting plate to provide improved resistance to separation from the wall stud by pull forces applied to a plug or other device connected thereto.

The terminal device provides the ability to hold fasteners in place, ready for use, which provides ease of use and the ability for improved point of sales packaging of the device including fasteners.

Fasteners are located such that they are easily accessible with a suitable tool.

The terminal device may be easily molded of plastic, thereby enabling it to be mass-produced at low unit cost.

These and other advantages will be understood by reading the following detailed description in conjunction with reference to the attached drawings.

SUMMARY OF THE INVENTION

The present invention comprises a terminal device for installing an access point for low voltage systems in newly constructed buildings. Low voltage systems typically employ coax cable, fiber optic cable, communications cables, or similar low voltage cables or wires. The device includes a rectangular mounting plate having an opening therein, a rear face for facing a wall stud and a forward face for facing a subsequently installed wall. The plate includes a forward-extending lip surrounding the opening and perpendicular to the plate. The depth of the forward-extending lip is selected to be approximately equal to the thickness of the subsequently installed wall. Included on one side of the rear face of the mounting plate is a wide rearward-extending side flange including two integral bosses and a cable-holding arrangement. The rear side of the mounting plate and the outer surface of the wide flange join at a 90 degree angle to form a seat for flush fitting against a wall stud. The lip includes two integral bosses for accepting fasteners for securing a faceplate to the terminal device. The terminal device is installed by driving fasteners through the bosses of the wide flange and into a wall stud. The mounting plate is then securely fastened to a wall by tightening the faceplate fasteners. Low voltage wiring may then be routed through the semicircular ring for temporary storage or tied off to the ring to secure it thereto.

DESCRIPTION OF THE DRAWINGS

FIG. 1 is a plan view of a preferred embodiment of the terminal device of the present invention.

FIG. 2 is a side view of the terminal device taken along line 2—2 of FIG. 1.

FIG. 3 is an end view of the terminal device taken along line 3—3 FIG. 1.

FIG. 4 is a perspective view of the rear side of the terminal device of FIG. 1 fitted flush against a wall stud and with the fasteners exploded away.

Index to Reference Numerals in Drawings

Figure 6:
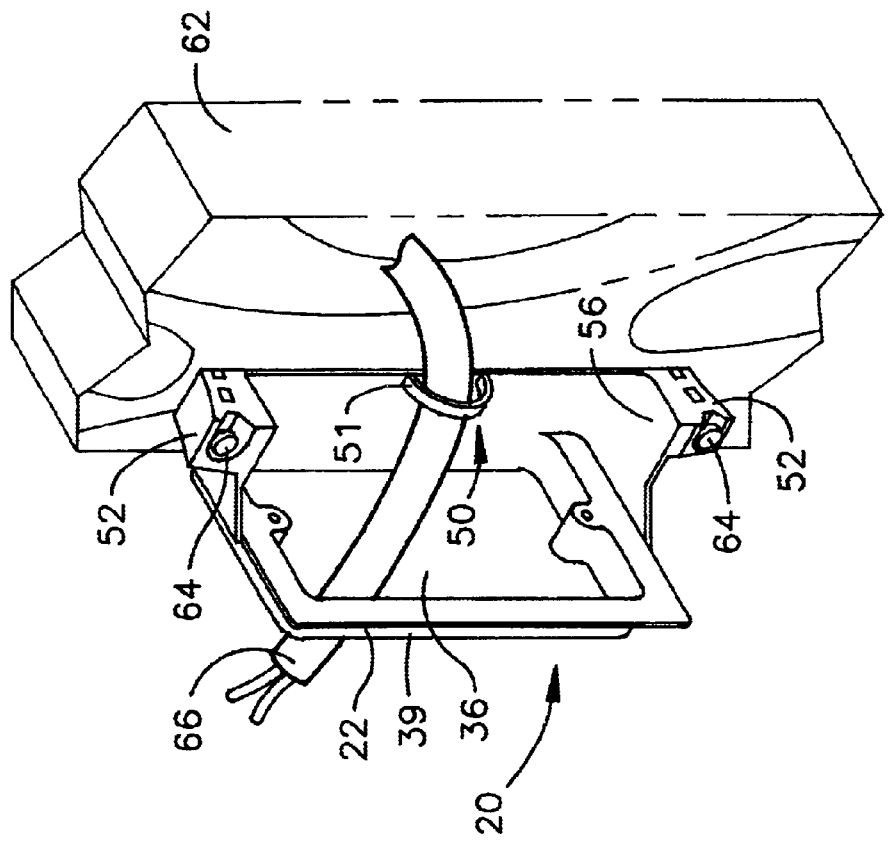
FIG. 6 is a perspective view of the terminal device from the rear side with the fasteners driven into the wall stud and with a low-voltage cable routed through the cable-holding arrangement.

| | |
|---|---|
| 20 | terminal device |
| 22 | mounting plate |
| 24 | first side |
| 26 | second side |
| 28 | first end |
| 30 | second end |
| 32 | inner periphery |
| 34 | outer periphery |
| 36 | access opening |
| 37 | forward face |
| 38 | rearward face |
| 39 | lip |
| 40 | side flange |
| 42 | forward end |
| 44 | rearward end |
| 45 | fastening arrangement |
| 46 | faceplate boss |
| 48 | aperture |
| 50 | cable-holding arrangement |
| 51 | semicircular ring |
| 52 | end boss |
| 54 | aperture |
| 56 | end flange |

-continued

Index to Reference Numerals in Drawings

| | |
|---|---|
| 58 | seat |
| 62 | wall stud |
| 64 | fastener |
| 66 | cable |

DETAILED DESCRIPTION OF THE INVENTION

Referring to FIGS. 1 and 2, the present invention, a terminal device for low-voltage systems comprises a one-piece terminal device 20 having a rectangular-shaped mounting plate 22 with a first side 24, a second side 26, ends 28 and 30, an inner periphery 32, an outer periphery 34, and an access opening 36 therein. The mounting plate includes a forward face 37, a rearward face 38, and a forward-extending lip 39 along the inner periphery 32 which would be projecting toward the viewer in FIG. 1. A rearward-extending side flange 40 is integral with and extends at a 90° angle from a first side 24 of the rearward face 38 of the mounting plate 22. The terminal device 20 therefore includes a forward end 42 located at the farthest extent of the lip 39 and a rearward end 44 at the farthest extent of the side flange 40 as depicted in FIG. 2. A faceplate fastening arrangement 45 consisting of faceplate bosses 46 and apertures 48 extends from the inner periphery 32 of the mounting plate 22 and a cable-holding arrangement 50 is provided on the side flange 40 as shown. The cable-holding arrangement 50 may consist of a semicircular ring 51 as shown. End bosses 52 are located on each end 28, 30 of the mounting plate 22 and include apertures 54 for receipt of fasteners (not shown).

Integral end flanges 56 extend between the side flange 40 and each end 28, 30 of the mounting plate 22 in the locations depicted in FIG. 2. As shown in the end view of the terminal device 20 in FIG. 3, the end flanges 56 bridge between the end 30 of the mounting plate 22 and the side flange 40 and thereby provide structural rigidity to the one-piece terminal device 20.

Figure 7:
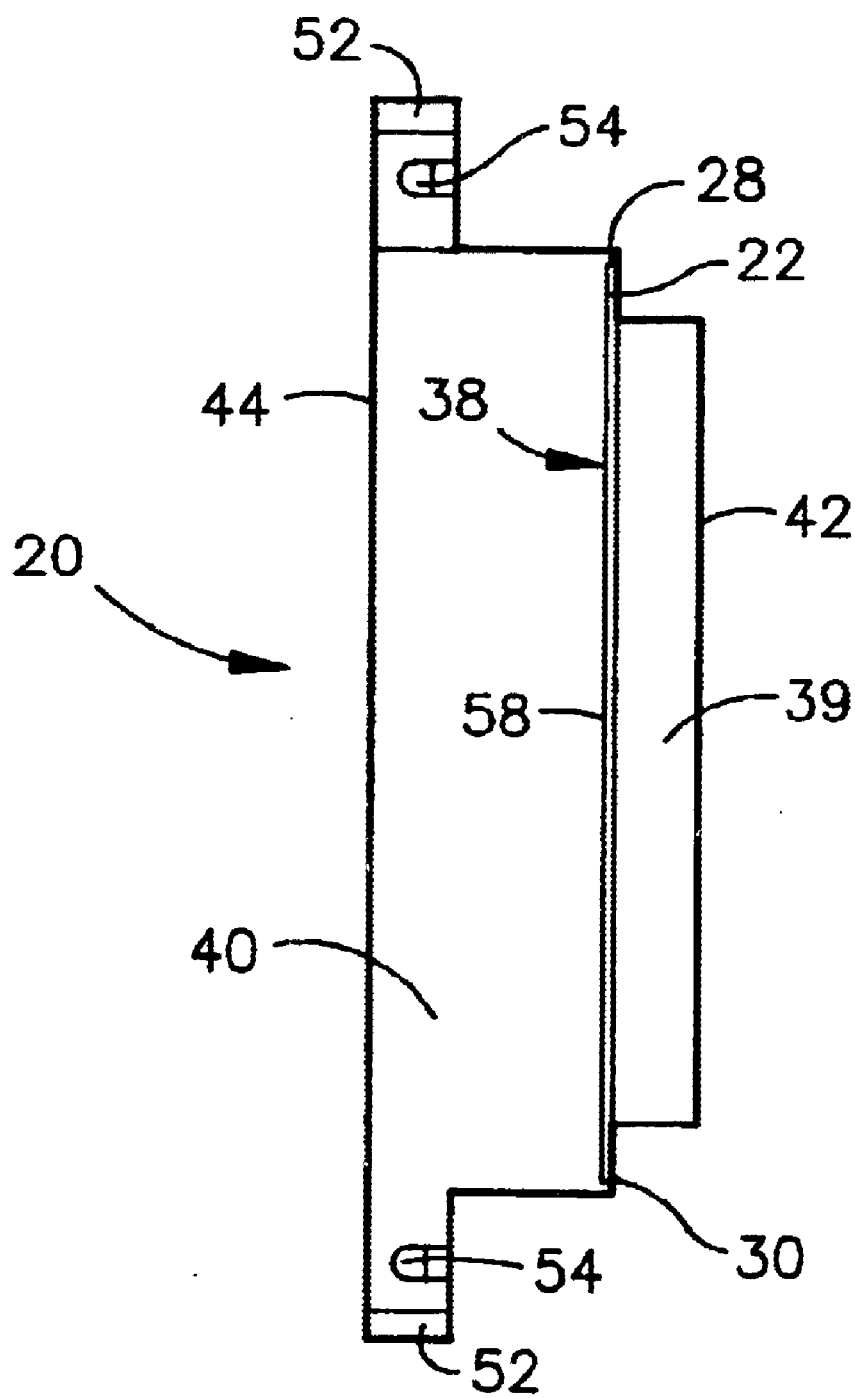
FIG. 7 is a side view of the terminal device taken along line 7—7 of FIG. 1.

Referring to FIG. 7, a side view from line 7—7 of FIG. 1, the terminal device 20 includes a seat 58. The seat 58 is formed by the rearward face 38 of the mounting plate 22 and the outward facing surface of the side flange 40.

Figure 5:
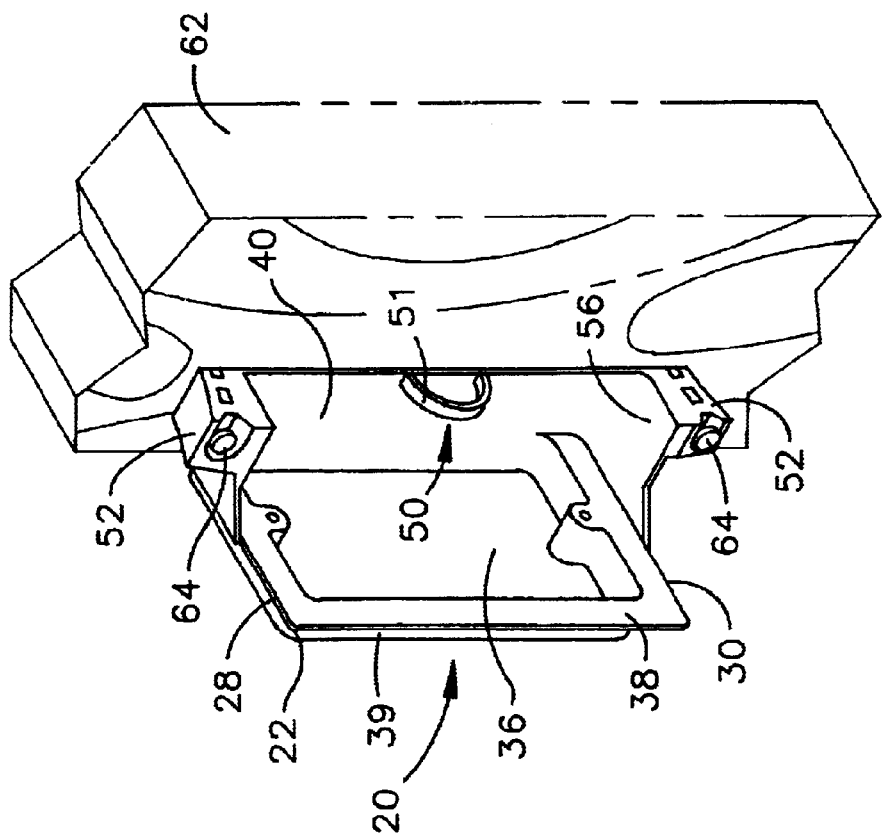
FIG. 5 is a perspective view of the terminal device from the rear side and with the fasteners driven into the wall stud.

The operation of the low-voltage terminal device 20 of the present invention can best be understood by reference to FIGS. 4, 5, and 6. A suitable location is selected for the location of a low-voltage device and, as depicted in FIG. 4, the terminal device 20 is placed against a wall stud 62 with the seat (not shown) flush against the stud. Suitable fasteners 64 are then aligned with and inserted into the apertures 54 in the end bosses 52 and are driven into the wall stud 62 to secure the terminal device 20 to the stud. It should be noted that the fasteners 64 are oriented such that they are easily accessible with a suitable tool. As shown particularly in FIG. 4, the end bosses 52 are oriented outwardly at an angle of preferably 10° or more with respect to the respective ends 28, 30 of the mounting plate 22 in order to make the fasteners 64 easily accessible with a suitable tool.

It should be noted that the apertures 54 in the end bosses 52 are designed to create a tortuous path for the fasteners 64. As a result of this tortuous path, common fasteners of the appropriate size may be inserted in the bosses 52 prior to shipment to the end user of the terminal device. This is a convenience feature for the installer as it makes it easy to quickly secure the terminal device without having to locate a nail, screw, or other suitable fastener of the appropriate size. It also allows the terminal device and fasteners to be assembled ahead of time so that a quantity of the assembled terminal devices and the associated fasteners may be packaged in a container for point of sales display.

After the fasteners 64 have been driven into the wall stud 62, as shown in FIG. 5, the terminal device 20 is secured firmly to the stud. Typically, the low-voltage terminal device 20 is secured to an appropriate stud during the roughing-out phase of construction.

As shown in FIG. 6, a low-voltage cable 66 is then routed through the semicircular ring 51 and out the access opening 36 in the mounting plate 22. Although it is not shown in FIG. 6, the low-voltage cable 66 may be tied off to the ring 51 if desired to further secure the cable or wiring. The sheet rock or other wall is then installed over the studs. A hole is therefore cut in the sheet rock (not shown) in the appropriate location and of an appropriate size to fit over the lip 39 of the terminal device 20. The lip 39 extends forward of the mounting plate 22 and typically extends the depth of the wall material. After the sheet rock is installed, wiring connections are completed to the low-voltage outlet or other device (not shown), and an appropriate faceplate (not shown) installed thereon. The outer periphery of the faceplate is larger than the hole in the sheet rock, and therefore tightening of the faceplate fasteners (not shown) will draw the terminal device 20 tightly against the wall.

As shown in FIG. 7, the side flange 40 is very wide and the end bosses 52 are situated against the rearward end 44 of the terminal device 20. By situating the end bosses 52 a remote distance from the forward end 42 of the terminal device 20, and providing rigidifying end flanges 56 that bridge the mounting plate 22 with the side flange 40, forward pulling on a device attached to the terminal device 20 will be resisted by the securing arrangement.

Referring to FIG. 6, the distance from the rearward face 38 of the mounting plate 22 to the axial center of the fasteners is typically 0.875 inch. A standard wall stud 62 typically measures 3.5 inches across its long side. The wide side flange 40 therefore locates the fasteners 64 typically 25% of the total length across the long side of the wall stud. Prior art terminal devices typically locate the fasteners on ears extending in the plane of the mounting plate. By relocating the fasteners far back on a side flange versus on a common plane with the mounting plate, the terminal device is markedly improved in its ability to resist pull forces applied to any low-voltage device secured to the mounting plate.

The cable-holding arrangement 50 provides a device for holding an inserted cable or wiring. It allows the cable 66 to be inserted therein and thereby held until the wall is installed. It may be tied off for greater security if desired. After the wall is installed, wiring connections may be made outside the terminal device, and the excess cable and wiring may then be pushed inside the access opening 36. The semicircular ring 51 allows excess cable to pass through easily, thereby minimizing bending stress on cables. This may be desirable for those types of cables that are susceptible to damage or deterioration in performance from bending, such as fiber optic cables or high speed communications cables. For other types of cables, it may be desired to tie the cables off at the semicircular ring 51, so that excess cable may be shortened to the desired length after the wall is installed or the excess cable may be bent around the semicircular ring to hold it in place.

Additionally, the terminal device provides end bosses 52 that are designed to hold the fasteners 64 in place and ready for use. This improves the functionality of the terminal device, making it easy to install. Including the fasteners with the terminal device enhances the point of sales packaging of the device.

The one-piece terminal device of the present invention may be easily molded of plastic, thereby making enabling it to be mass-produced at a low unit cost.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A one-piece terminal device for low-voltage systems comprising:

a generally rectangular and planar mounting plate including a forward face, a rearward face, two ends, a generally rectangular opening therein, and an inner periphery surrounding said opening;

a lip extending from said forward face at said inner periphery;

a side flange extending from said rearward face along a first side of said inner periphery, said side flange including a rearward end and an outer surface;

two or more bosses at said rearward end of said side flange, said bosses for receipt of fasteners;

a fastening arrangement in said mounting plate for securing a faceplate thereto; and wherein said rearward face said mounting plate and said outer surface of said side flange form a seat at a 90 degree angle with said seat capable of seating flush against a corner of a wall stud.

2. The one-piece terminal device of claim 1 wherein each of said bosses include a tortuous path and a fasteners having a forward end.

3. The one-piece terminal device of claim 2 wherein said tortuous paths are capable of capturing and holding said forward ends of said fasteners.

4. The one-piece terminal device of claim 3 wherein said fasteners are partially inserted in said bosses such that said forward ends of said fasteners are embedded in said tortuous paths in said bosses and are held therein by friction.

5. The one-piece terminal device of claim 3 wherein said fasteners have axial centers and the distance between said rearward face of said mounting plate and said axial centers of said fasteners in said bosses is 0.875 inch.

6. The one-piece terminal device of claim 5 wherein said distance between said rearward face of said mounting plate and said axial centers of said fasteners in said bosses locate said fasteners at least 25% along the long side of a wall stud.

7. The one-piece terminal device of claim 1 wherein said side flange includes a cable holding arrangement.

8. The one-piece terminal device of claim 7 wherein said cable holding arrangement is a semicircular ring.

9. The one-piece terminal device of claim 1 wherein said bosses are oriented outwardly at an angle of 10° or more with respect to said ends of said mounting plate.

10. The one-piece terminal device of claim 1 wherein said fastening arrangement in said mounting plate includes two faceplate bosses at opposite ends of said mounting plate, said faceplate bosses integral with said inner periphery.

11. A one-piece terminal device for low-voltage systems comprising:

a generally rectangular and planar mounting plate including a forward face, a rearward face, a generally rectangular opening therein, and an inner periphery surrounding said opening;

a lip extending from said forward face at said inner periphery;

a side flange extending from said rearward face along a first side of said inner periphery, said side flange including a rearward end and an outer surface;

two or more bosses at said rearward end of said side flange, said bosses for receipt of fasteners;

a fastening arrangement in said mounting plate for securing a faceplate thereto; and wherein said terminal device includes end flanges at each end of said mounting plate that bridge between said side flange and said rearward face of said mounting plate thereby providing structural rigidity to said one-piece terminal device.

* * * * *